C. E. BROWER.
PNEUMATIC TIRE.
APPLICATION FILED FEB. 7, 1910.
1,000,069.
Patented Aug. 8, 1911.
2 SHEETS—SHEET 2.
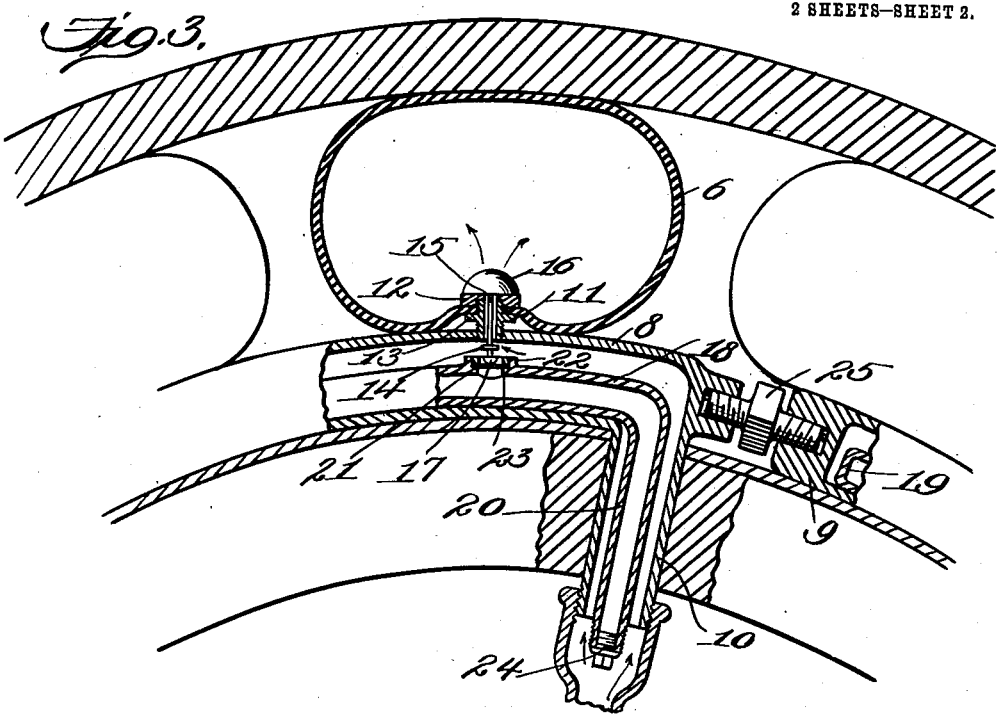
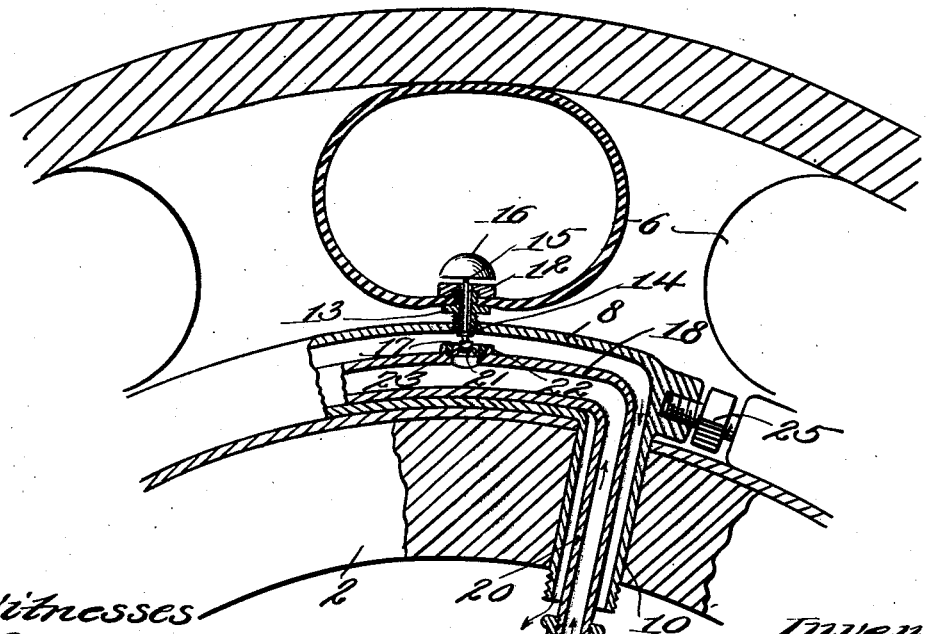
Witnesses
Inventor
Charles E. Brower
By James L. Norris

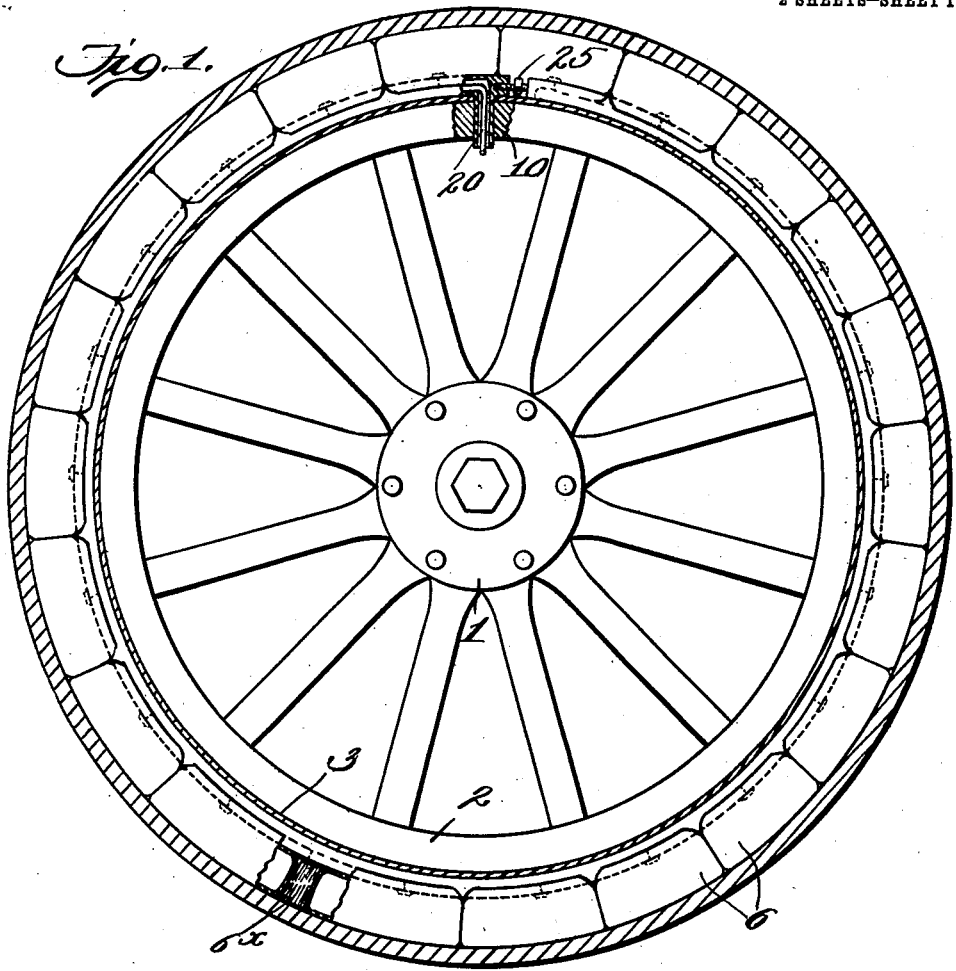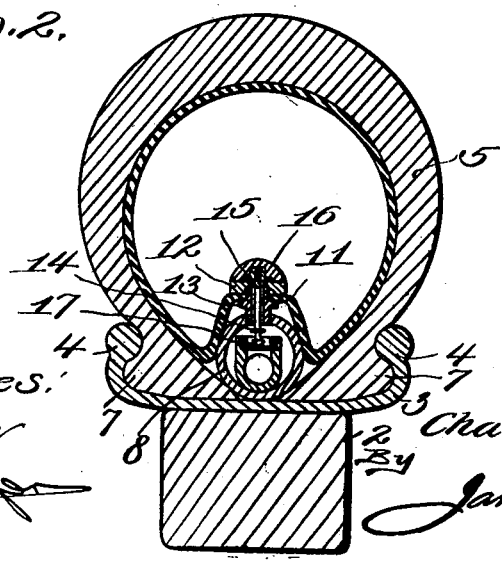

UNITED STATES PATENT OFFICE.

CHARLES E. BROWER, OF MEMPHIS, TENNESSEE.

PNEUMATIC TIRE.

1,000,069.  Specification of Letters Patent.  Patented Aug. 8, 1911.

Application filed February 7, 1910. Serial No. 542,471.

*To all whom it may concern:*

Be it known that I, CHARLES E. BROWER, a citizen of the United States, residing at Memphis, in the county of Shelby and State of Tennessee, have invented new and useful Improvements in Pneumatic Tires, of which the following is a specification.

This invention relates to new and useful improvements in pneumatic tires of that general type which embodies an outer casing and a plurality of inflatable units arranged within the casing in conterminous circumferentially disposed relation.

According to the present invention the inflatable inner units are associated with a common inflating tube of interrupted annular outline in such a manner that the units, the tube, and other adjuncts to be referred to, are self-contained. This admits of the assemblage of the tire in the ordinary manner upon a rim of ordinary form and in connection with which no special features of construction are provided.

The invention also proposes the combination with the features noted in the preceding paragraph, of a deflating arrangement of such nature that the several units may be deflated simultaneously. The preferred form of this arrangement consists of a tube which is located within the inflating tube, and which is provided at proper intervals with expansible or equivalent devices for opening the valves of the units and permitting the escape of air therefrom. The valve opening devices are pressure operated and for the purposes of convenience and inexpensiveness the two tubes have co-axial connections which project radially through the felly in the manner of the ordinary tire valve and to either of which the nipple of the air conducting pipe may be joined.

A preferred and advantageous embodiment of the invention is illustrated in the accompanying drawings, which comprise—
Figure 1, a vertical central section showing the application of a tire in accordance with the present invention; Fig. 2, a detail cross-section drawn to an enlarged scale; Fig. 3, a detail vertical central section illustrating the operation of inflating the units and drawn to an enlarged scale; and Fig. 4, a similar view illustrating the operation of deflating the units.

Similar characters of reference designate corresponding parts throughout the several views.

In Fig. 1, the wheel designated generally by the numeral 1, may be of any desired construction, being provided with the felly 2 and the rim 3. The latter is of the ordinary clencher type and is provided with the usual grooved or channeled side flanges, as 4.

The tire consists essentially of the outer casing, as 5, which is preferably of any approved clencher form, and the inner inflation units, as 6. The casing 5, in the embodiment disclosed, consists of the well known circumferentially split annular envelop, which may be of any desired composition and which has at its edges, the usual annular beads, as 7, for engagement in the grooves of the flanges 4, this engagement being maintained in the present construction in a manner similar to the manner in which it is maintained in the ordinary outer and inner tube constructions, *i. e.*, by the pressure transmitted from the inner tube when the latter is in an inflated condition.

The inflation units 6 are of similar construction. Each inflation unit consists of a segmental envelop of the usual inner tube material, and of any desired circumferential dimension. The diametrical dimension of the envelop is, of course, determined by the inner diameter of the casing 5. The units 6 are carried upon an inflation tube, as 8, which is of interrupted annular form, and has its inner end closed, as at 9, (Fig. 3) and its other end bent angularly and extended inwardly and radially through an opening in the felly 2, as at 10, in the manner of an ordinary tire valve. The tube 8 has its seating between the beaded edge portions 7 and when the units are inflated, assists in maintaining the engagement of the beads in the grooves of the flanges 4. As above stated, the inflation units are arranged in conterminous relation and they are severally attached to the tube 8 as by connecting members 11. The latter consists of tubular posts which are threaded into the tube 8, and into valve seats 12, one of which is held against the inner face of each unit. Each post 11 has a straight sided flange, as 13, which coöperates with the adjacent valve seat 12 to rigidly and firmly hold the portions of the units immediately surrounding the posts. It is preferred that the admission and exhaust of air from each unit be controlled by a single valve and such a valve, as 16, coöperates with the seat 12 and has a stem, as 15, which projects through the post and at its inner end is provided with a head 17 and with a stop flange 14. The stem 15 is preferably threaded into the valve head in any convenient manner and is of considerably less diameter than the opening in the post in order that the valve may readily be moved by pressure in the well known manner to permit of the inflation of the unit.

As above stated, the invention proposes the simultaneous control of the valves 16 for the purpose of deflation and the preferred construction whereby this object may be carried out, is as follows. Within the tube 8 is a deflating tube, as 18, which is, of course, of smaller diameter than the tube 8, but is otherwise similar thereto, being of interrupted annular outline, having a closed end, as 19, and an end portion, as 20, which is bent at an angle and which projects radially and inwardly through the felly and is likewise concentrically located within the portion 10 of the tube 8. The tube 18 is provided at intervals, corresponding to the intervals of the valves 16, with valve operating devices, which may conveniently consist of a pressure expansible diaphragm, as 21, held against its seat within a boss 22, by a nut, as 23, which is threaded into said boss.

The angular portion 20 of the tube 18 is of greater length than the angular portion 10 of the tube 8 and projects beyond the same, and is normally closed by a removable plug, as 24. Each of the angular portions 10 and 20 is provided at its outer end with threads to enable the attachment thereto of the nipples of the air conducting tube.

The manner of use, as well as the advantages claimed for the invention, will be readily understood from the foregoing description, taken in connection with what follows. The tire is originally assembled with the units 6 in a deflated condition, in the same manner that an ordinary inner and outer tube clencher tire is assembled, the self-contained structure consisting of the inflating and deflating tubes and the units, taking the place of the inner tube. The inflating and deflating tubes, of course, have sufficient inherent elasticity to provide for their ready mounting and de-mounting. After the tire has been assembled, the nipple of the air conducting tube is attached to the portion 10 of the tube 8 (Fig. 3) and air is forced through said tube 8 and, opening the valves 16 in the ordinary manner, enters the several units which are thereby inflated and expanded to such an extent as to contact with one another at their ends in the manner shown in Fig. 1. In the event of the puncture of any one of the units and its consequent collapse, the adjacent units proportionally expand so that the space formerly occupied by the punctured unit is for the most part taken up. As a consequence, the units as a series will at all times entirely occupy the interior space of the casing 5. This is apparent from Fig. 1, wherein one of the units, as $6^x$, is shown as in a collapsed condition. In addition to the fact that the deflation of any one, or, it might be, more than one unit, does not seriously hinder the efficient use of the tire and the completion of the trip, the structure is also of advantage in that each unit is self-contained and, together with its adjuncts, may be readily removed from the tube 8 and as readily replaced when repaired. In case it is not feasible to repair the damaged unit, a new one may be substituted, the cost of which will be slight as compared with the cost of an entire new inner tube, the purchase of which is frequently necessitated in the ordinary constructions.

When it is desired to deflate the units, the plug 24 (which is normally employed to prevent pressure disturbances in the tube 18) is removed, and a smaller nipple is joined to the portion 20 of said tube 18 (Fig. 4). Air, being then forced into said tube, acts to expand the valve operating devices, in this instance the diaphragms 21, and the latter, as a consequence of such expansion, engage the heads 17 and move the latter outwardly. Therewith the valves 16 are unseated and the air exhausts from the units into the tube 8, passing outwardly from thence through the portion 10 which is open to the atmosphere.

If desired, the ends of the tube 8 may be positively connected, as, for example, by a turnbuckle device 25.

It will be understood that no specific description herein contained, is intended to put any limitations on the claims, not inherent in the language thereof.

Having fully described my invention, I claim:

1. A tire consisting of an outer casing, a plurality of inflatable units therein, each of which is provided with a controlling valve, an inflating tube common to the units and through which air is forced to enter the units, a deflating tube also common to the units and pressure operated devices within the deflating tube for effecting the opening movements of the valves.

2. A tire consisting of an outer casing, a plurality of inflatable units therein, an inflating tube common to the units and communicating therewith, a valve controlling the communication of each unit and the tube, a deflating tube arranged within the inflating tube, and pressure operated devices associated with the deflating tube to effect the opening movements of the valves, the tubes having coincident, inwardly and radially extending inlet end portions.

3. A tire consisting of an outer casing, an inflating tube therein, a deflating tube within the inflating tube, a plurality of inflatable units circumferentially disposed with relation to the inflating tube, and a coupling for each unit consisting of a hollow post passed through the unit and threaded into the inflating tube, a valve seat associated with the inner end of the post, and a valve in coöperation with the valve seat and having a stem which projects loosely through the post and pressure operated devices associated with the deflating tube for effecting the opening movements of the valves.

In testimony whereof I have hereunto set my hand in presence of two subscribing witnesses.

CHARLES E. BROWER.

Witnesses:
ALBERT G. RILEY,
R. G. BROWN.